United States Patent
Lee et al.

(10) Patent No.: US 9,979,520 B2
(45) Date of Patent: May 22, 2018

(54) METHOD AND APPARATUS FOR RECEIVING OR TRANSMITTING DOWNLINK CONTROL SIGNAL IN WIRELESS COMMUNICATION SYSTEM

(71) Applicant: LG ELECTRONICS INC., Seoul (KR)

(72) Inventors: Jihyun Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 106 days.

(21) Appl. No.: 14/764,074

(22) PCT Filed: Jan. 20, 2014

(86) PCT No.: PCT/KR2014/000554
§ 371 (c)(1),
(2) Date: Jul. 28, 2015

(87) PCT Pub. No.: WO2014/119865
PCT Pub. Date: Aug. 7, 2014

(65) Prior Publication Data
US 2015/0365928 A1 Dec. 17, 2015

Related U.S. Application Data

(60) Provisional application No. 61/758,273, filed on Jan. 29, 2013.

(51) Int. Cl.
*H04L 5/00* (2006.01)
*H04W 72/04* (2009.01)
*H04L 1/00* (2006.01)

(52) U.S. Cl.
CPC .......... *H04L 5/0035* (2013.01); *H04L 1/0067* (2013.01); *H04L 5/0048* (2013.01);
(Continued)

(58) Field of Classification Search
CPC ..... H04L 5/001; H04L 5/0053; H04L 5/0094; H04L 5/0037; H04L 5/0048; H04L 5/0035; H04L 5/0098; H04L 5/003
See application file for complete search history.

(56) References Cited

U.S. PATENT DOCUMENTS

2011/0170496 A1* 7/2011 Fong ............... H04L 5/0053
370/329
2013/0010724 A1* 1/2013 Han ................. H04L 5/0007
370/329
(Continued)

FOREIGN PATENT DOCUMENTS

WO WO 2010/053984 A2 5/2010
WO WO 2012/109542 A1 8/2012

OTHER PUBLICATIONS

Intel Corporation, "UE behaviour for SPS PDSCH in subframe configured for EPDCCH," 3GPP TSG-RAN WG1 #71, New Orleans, USA, Nov. 12-16, 2012, R1-124726, pp. 1-3.
(Continued)

Primary Examiner — Raj Jain
(74) Attorney, Agent, or Firm — Birch, Stewart, Kolasch & Birch, LLP

(57) ABSTRACT

A method of transmitting a downlink signal to a terminal by a base station is provided. The base station transmits a semi-persistent scheduling (SPS) downlink data and/or control information related to the SPS downlink data. The base station performs rate matching of the SPS downlink data for particular control information in a particular subframe when the particular control information schedules the SPS downlink data in the particular subframe, and rate matching of the SPS downlink data for a resource block pair including a resource block pair for subsequent particular control information in a particular subframe when the particular control information does not schedule the SPS downlink data in the
(Continued)

particular subframe. The rate matching of the SPS downlink data is performed with respect to a resource block pair in which the particular control information is detected, or a resource block pair including one or more search spaces.

9 Claims, 12 Drawing Sheets

(52) U.S. Cl.
CPC ......... *H04W 72/04* (2013.01); *H04W 72/042* (2013.01); *H04W 72/044* (2013.01); *H04L 5/0007* (2013.01); *H04L 5/0044* (2013.01); *H04L 5/0053* (2013.01); *H04L 5/0098* (2013.01)

(56) References Cited

U.S. PATENT DOCUMENTS

2013/0088972 A1* 4/2013 Kim .................. H04L 5/001
 370/241
2014/0314018 A1* 10/2014 Gao .................. H04L 5/0051
 370/329

OTHER PUBLICATIONS

LG Electronics, "Remaining details on EPDCCH resource configuration," 3GPP TSG RAN WG1 Meeting #71, New Orleans, USA, Nov. 12-16, 2012, R1-124983, pp. 1-4.
Mediatek Inc. et al., "Further Details of EPDCCH Starting Symbol Configuration," 3GPP TSG-RAN WG1 #71, New Orleans, USA, Nov. 12-16, 2012, R1-124939, 3 pages.

* cited by examiner

FIG. 8
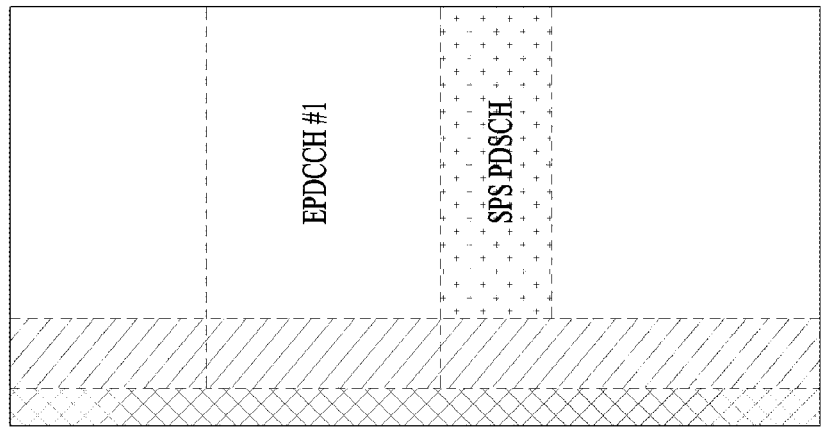
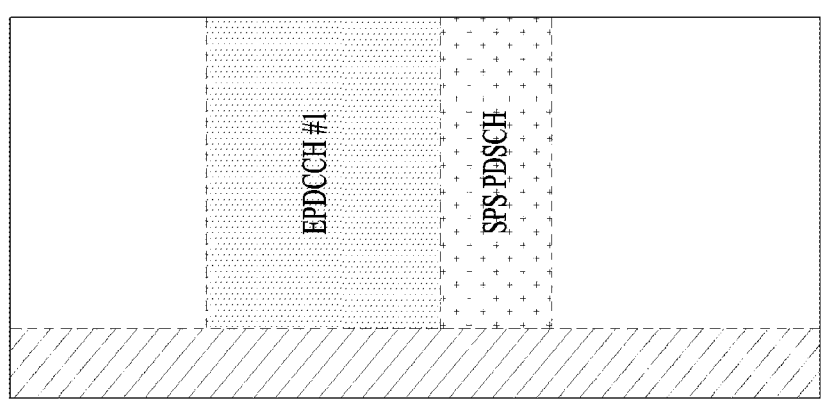
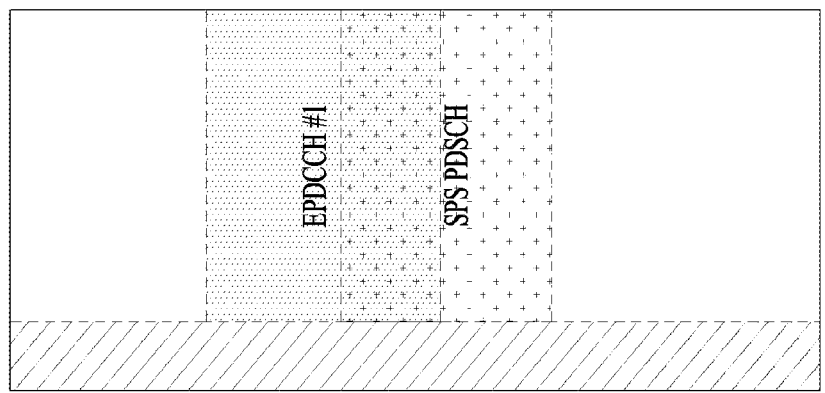

FIG. 9
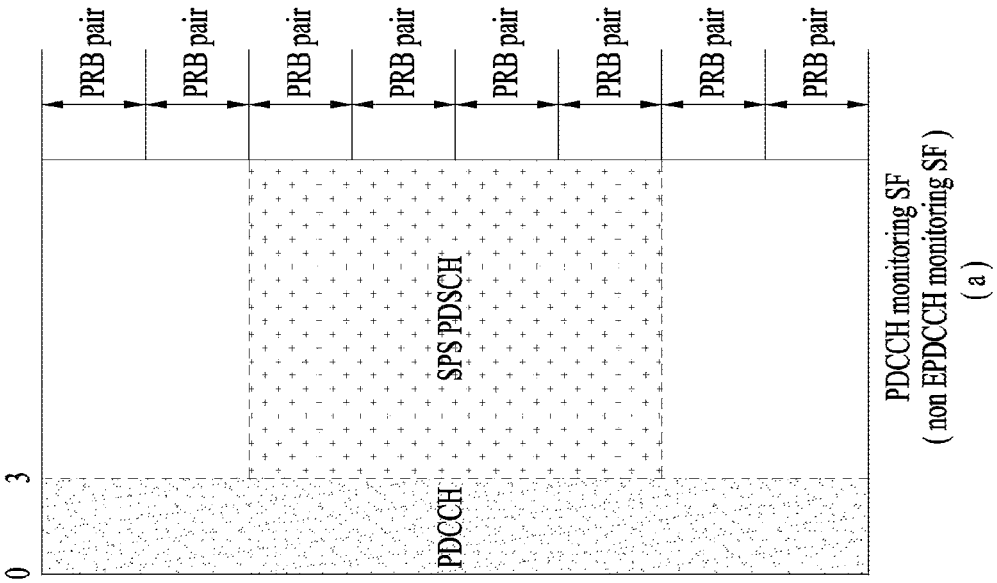
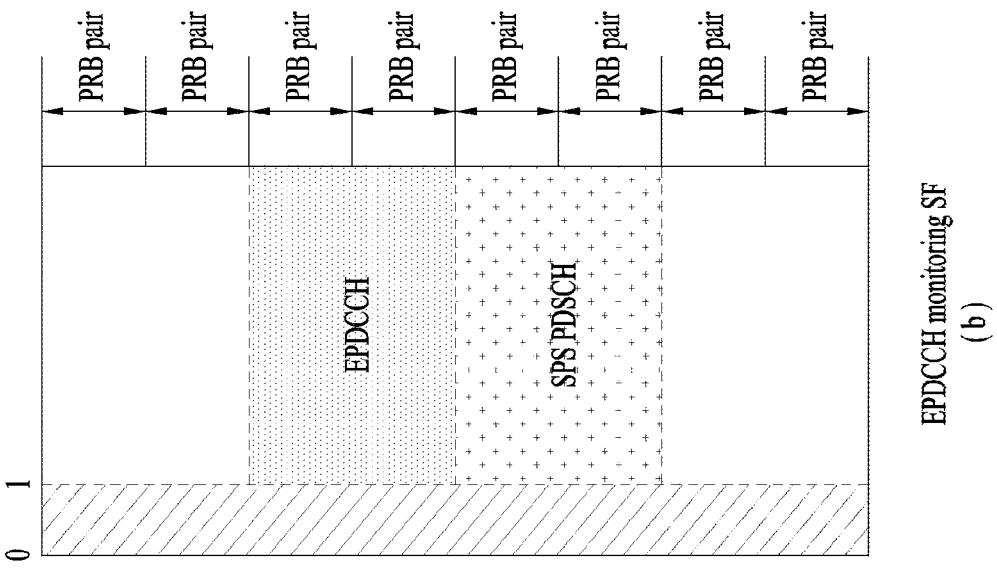

FIG. 11
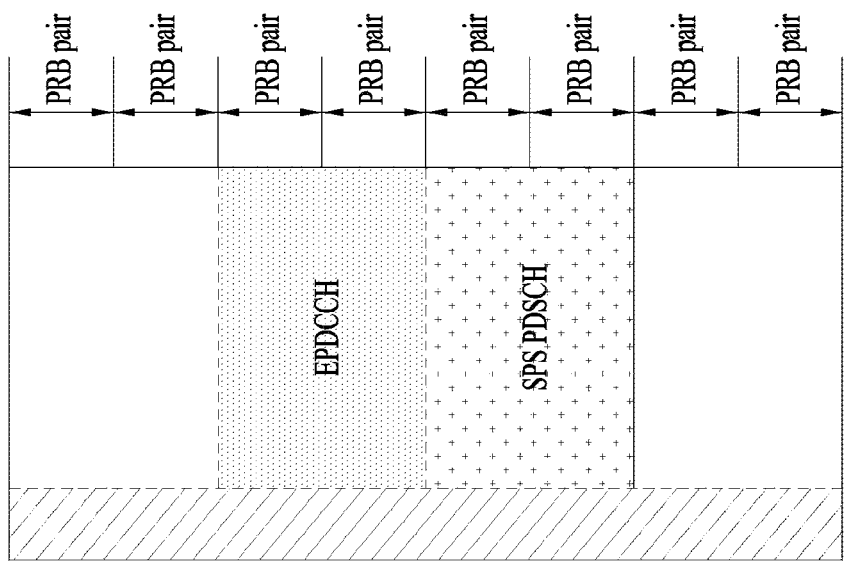
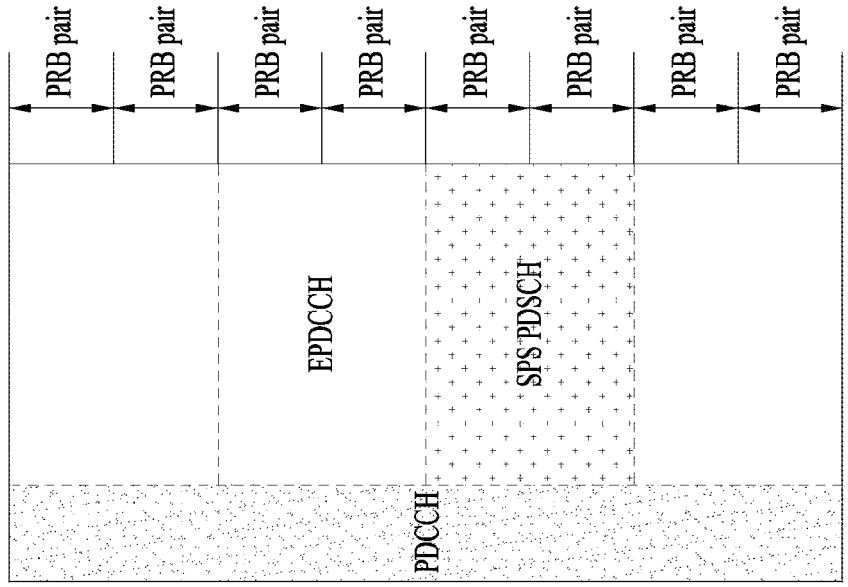

METHOD AND APPARATUS FOR RECEIVING OR TRANSMITTING DOWNLINK CONTROL SIGNAL IN WIRELESS COMMUNICATION SYSTEM

CROSS REFERENCE TO RELATED APPLICATIONS

This application is the National Phase of PCT/KR2014/000554 filed on Jan. 20, 2014, which claims priority under 35 U.S.C. 119(e) to U.S. Provisional Application No. 61/758,273 filed on Jan. 29, 2013, all of which are hereby expressly incorporated by reference into the present application.

TECHNICAL FIELD

The present invention relates to a wireless communication system and, more specifically, relates to a method of receiving or transmitting a downlink control signal in a wireless communication system, and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

The present invention proposes a method of receiving or transmitting downlink control information in a wireless communication system.

Technical problems to be solved by the present invention are not limited to the above-mentioned technical problems, and other technical problems not mentioned herein may be clearly understood by those skilled in the art from description below.

Technical Solution

The object of the present invention can be achieved by providing a method for transmitting a downlink signal to a terminal by a base station in a wireless communication system, the method including transmitting a downlink data channel for semi-persistent scheduling (SPS) (hereinafter referred to as an SPS-data channel) and/or a control channel related to the SPS-data channel, performing rate matching of the SPS-data channel for a particular control channel when the particular control channel is scheduled in a particular subframe in which the SPS-data channel is scheduled (hereinafter referred to as an SPS-subframe), wherein the rate matching is performed with respect to a resource block pair in which the particular control channel is detected, a resource block pair including a search space specific to the terminal for the particular control channel, or a resource block pair including all search spaces for the particular control channel.

Preferably, the rate matching of the SPS-data channel may be performed in all subframes corresponding to an activation interval of the SPS-data channel.

Preferably, the rate matching of the SPS-data channel may be performed in a subframe in which the particular control channel does not exist among subframes in the activation interval.

Preferably, the rate matching may be performed only in an SPS subframe including the particular control channel.

Preferably, the method may further include performing rate matching of the SPS-data channel for a resource block pair excluding a resource block pair for a subsequent particular control channel in an SPS subframe in which an activation of the SPS-data channel is performed when the activation of the SPS-data channel is not performed by the particular control channel.

Preferably, a resource region in which the rate matching may be determined according to a transmission mode of the particular control channel.

Preferably, the rate matching may be performed for a resource block pair including all sets for the particular control channel when the transmission mode corresponds to distributed transmission.

Preferably, the rate matching may be performed for a resource block pair including a particular control channel for the terminal when the transmission mode corresponds to localized transmission.

Preferably, the particular control channel may correspond to an enhanced physical downlink control channel (EPDCCH).

In another aspect of the present invention, provided herein is a method of transmitting a downlink signal from a base station by a terminal in a wireless communication system, the method including receiving a downlink data channel for semi-persistent scheduling (SPS) (hereinafter referred to as an SPS-data channel) and/or a control channel related to the SPS-data channel, wherein rate matching of the SPS-data channel is performed for a particular control channel when the particular control channel is scheduled in a particular subframe in which the SPS-data channel is scheduled (hereinafter referred to as an SPS-subframe), wherein the rate matching is performed for a resource block pair in which the particular control channel is detected, a resource block pair including a search space specific to the terminal for the particular control channel, or a resource block pair including all search spaces for the particular control channel.

It should be noted that the above-mentioned technical solutions are merely a part of embodiments of the present invention, and various embodiments reflecting technical characteristics of the present invention may be derived and understood by those skilled in the art from detailed description of the present invention given below.

Advantageous Effects

According to an embodiment of the present invention, the present invention may efficiently transmit and receive downlink control information in a wireless communication system.

Effects that may be obtained from the present invention are not limited to the above-mentioned effects, and other effects not mentioned herein may be clearly understood by those skilled in the art from description below.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 8 is a diagram illustrating another example of a configuration of an EPDCCH and an SPS-data channel according to another embodiment of the present invention.

FIG. 9 is a diagram illustrating another example of a configuration of an EPDCCH and an SPS-data channel according to another embodiment of the present invention.

FIG. 11 is a diagram illustrating another example of a configuration of an EPDCCH and an SPS-data channel according to another embodiment of the present invention.

BEST MODE

Figure 1:
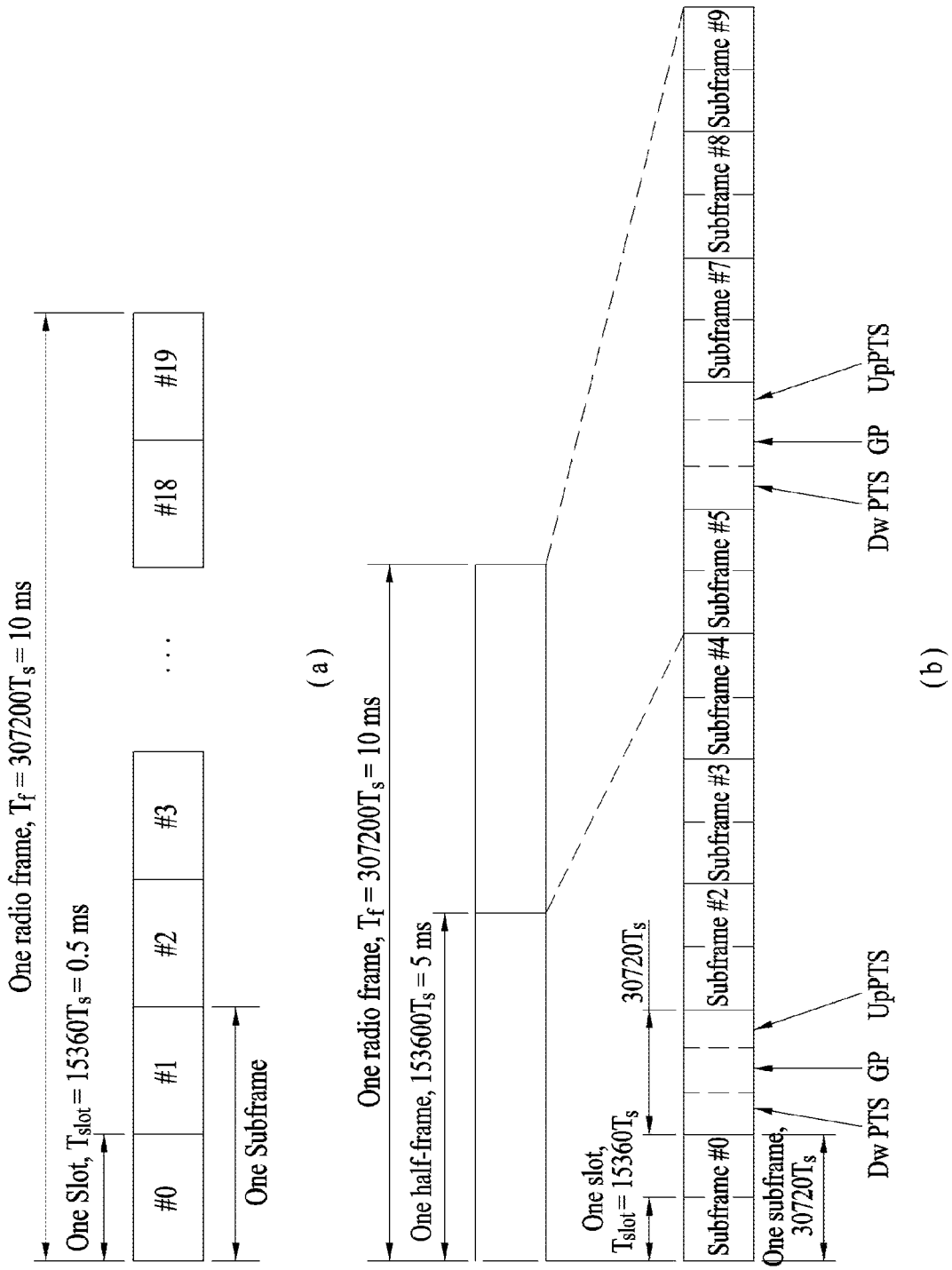
FIG. 1 is a diagram illustrating an example of a configuration of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |

Figure 2:
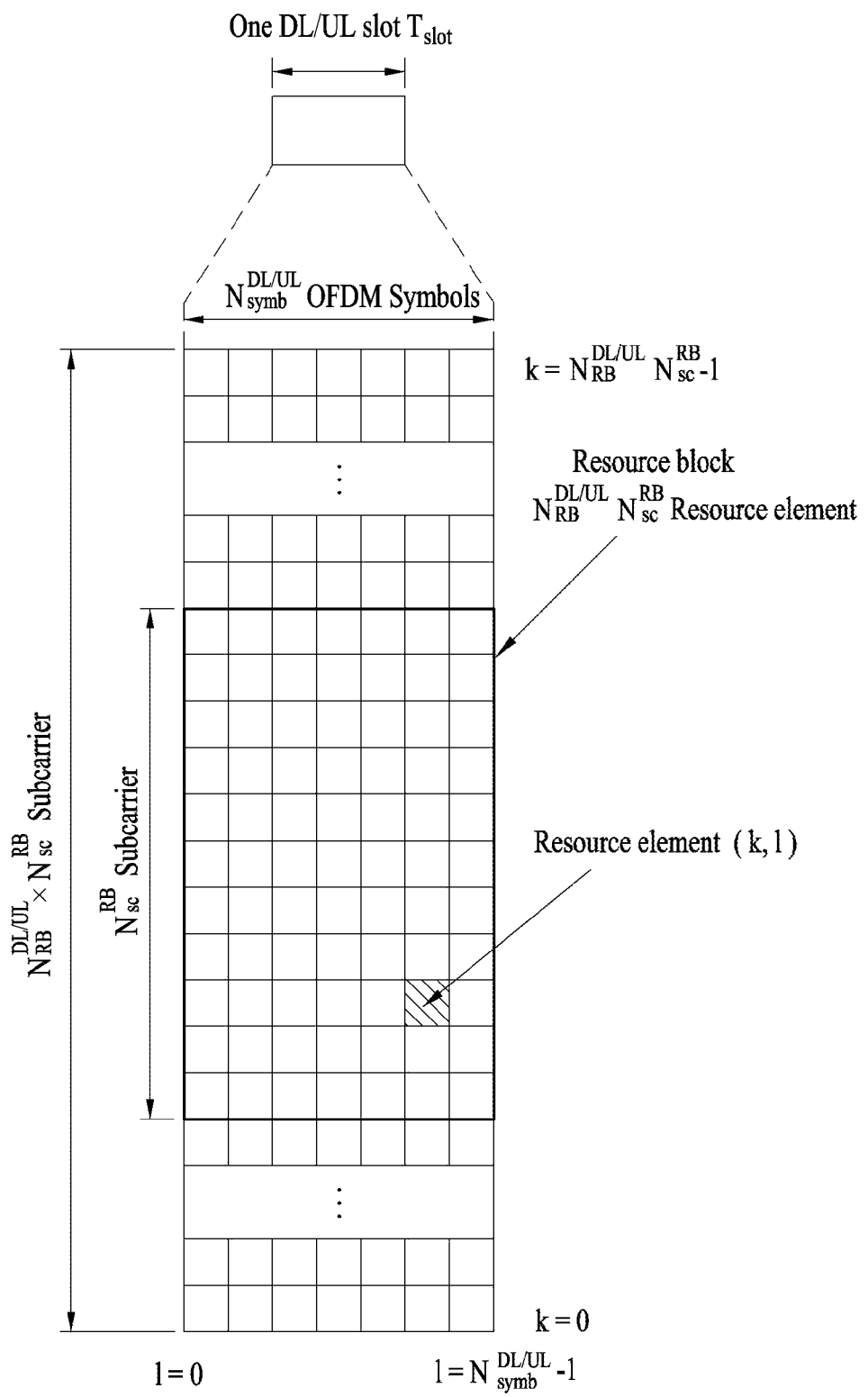
FIG. 2 is a diagram illustrating an example of a configuration of a downlink (DL)/uplink (UL) slot in the wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
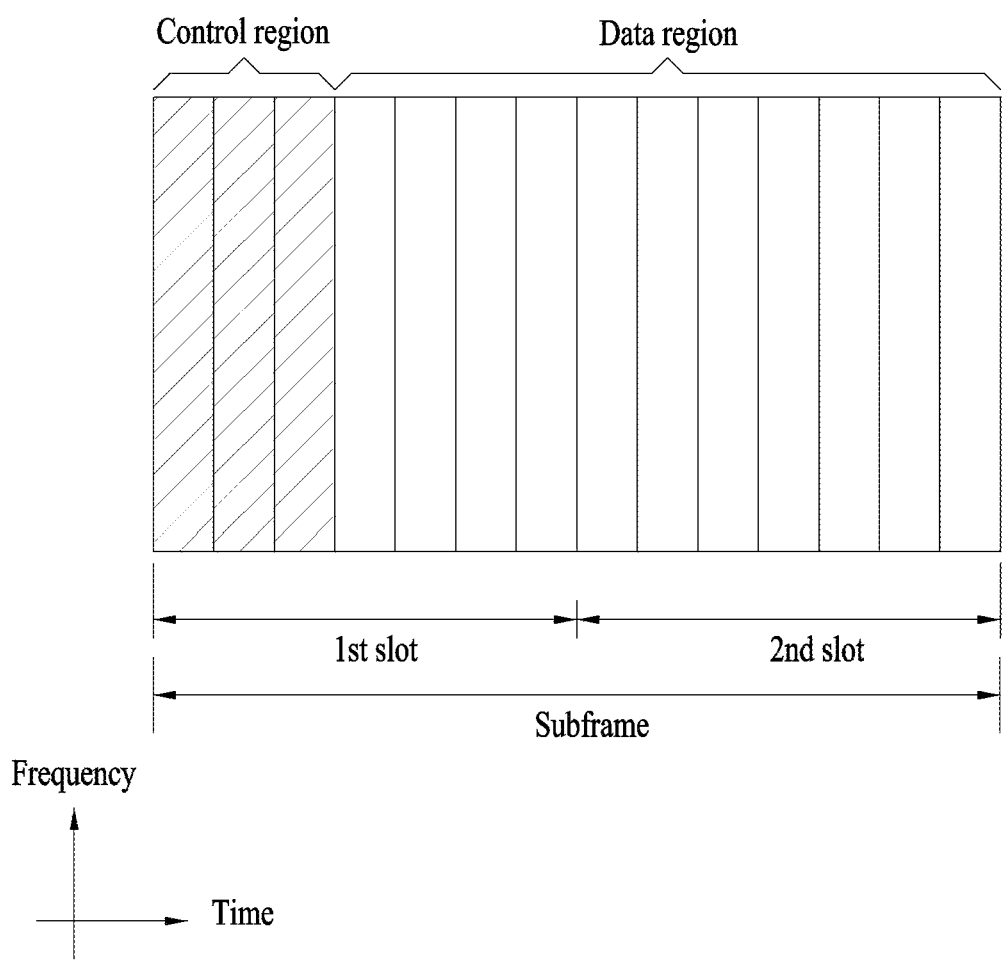
FIG. 3 is a diagram illustrating an example of a configuration of a DL subframe used in a 3rd generation partnership project (3GPP) long term evolution (LTE)/LTE-advanced (LTE-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | Number of |
|---|---|---|
| Type | Aggregation Level L | Size [in CCEs] | PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
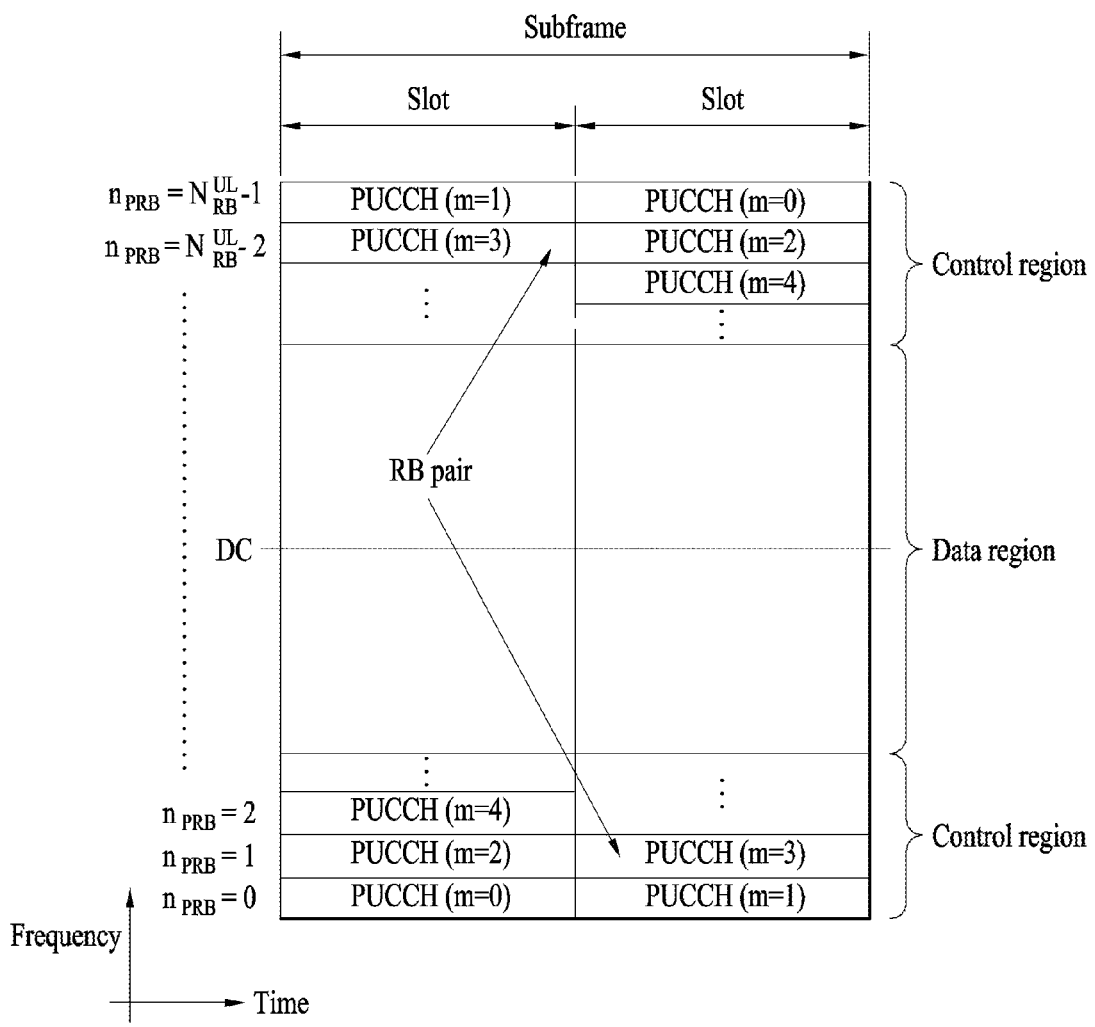
FIG. 4 is a diagram illustrating an example of a configuration of a UL subframe used in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUCCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

General EPDCCH (Enhanced PDCCH)

Owing to introduction of a multi-node system, although various communication schemes becomes available in a manner that channel quality improvement is achieved, introduction of a new control channel is being requested to apply the above-mentioned MIMO scheme and inter-cell coordinated communication scheme to the multi-node environment. Due to the above necessity, introduction of a new control channel is an Enhanced PDCCH (EPDCCH) is being intensively discussed, and the new control channel can be allocated to a data region (hereinafter referred to as a PDSCH region) instead of the legacy control region (hereinafter referred to as a PDCCH region). As a result, node control information can be transmitted per UE through EPDCCH, such that the problem of insufficiency of the legacy PDCCH region can also be solved. For reference, EPDCCH is not applied to the legacy UE, and can be received by the LTE-A UE only.

Figure 5:
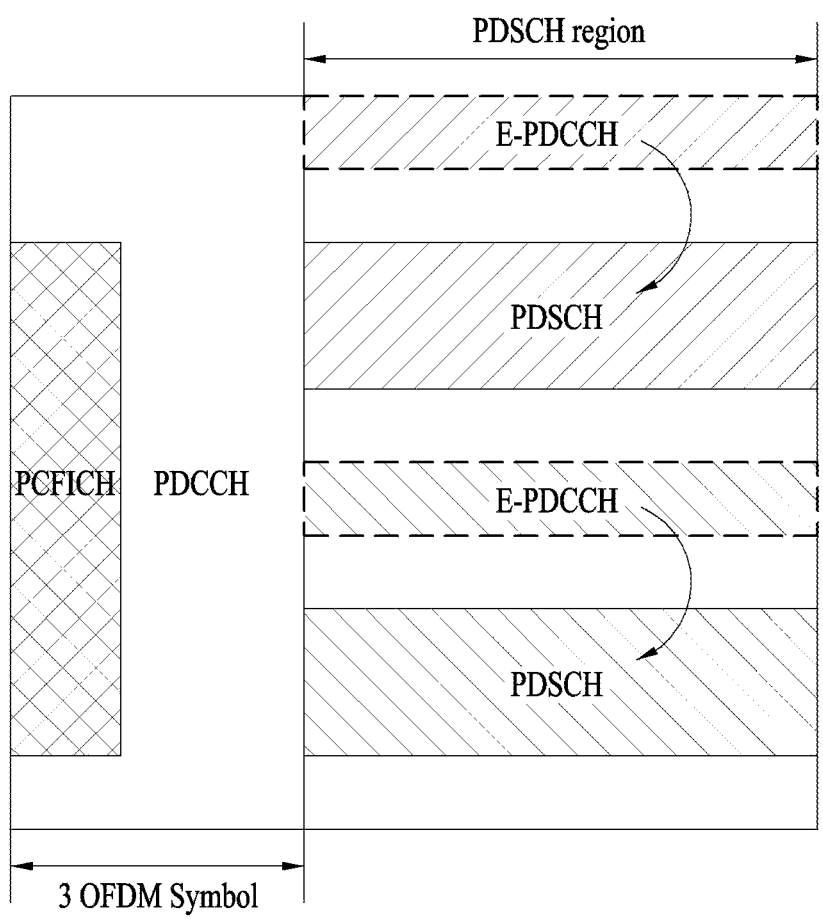
FIG. 5 is a diagram illustrating an enhanced physical downlink control channel (EPDCCH).

FIG. 5 is a conceptual diagram illustrating a carrier aggregation (CA) scheme.

Referring to FIG. 5, EPDCCH may define and use some parts of the PDSCH region configured to transmit data, and the UE has to perform blind decoding for detecting the presence or absence of EPDCCH. EPDCCH performs the same scheduling operation (i.e., PDSCH, PUSCH control) as in the legacy PDCCH. If the number of UEs connected to the same node as in RRH increases, many more EPDCCHs are allocated to the PDSCH region, such that the number of blind decoding times to be executed by the UE increases, resulting in increased complexity.

Meanwhile, a method for multiplexing EPDCCH for a plurality of UEs needs to be considered. In more detail, according to the multiplexing scheme proposed by the present invention, on the condition that a common resource region (i.e., a common PRB set) is configured, EPDCCHs of multiple UEs can be cross-interleaved to the frequency domain or the time domain.

Figure 6:
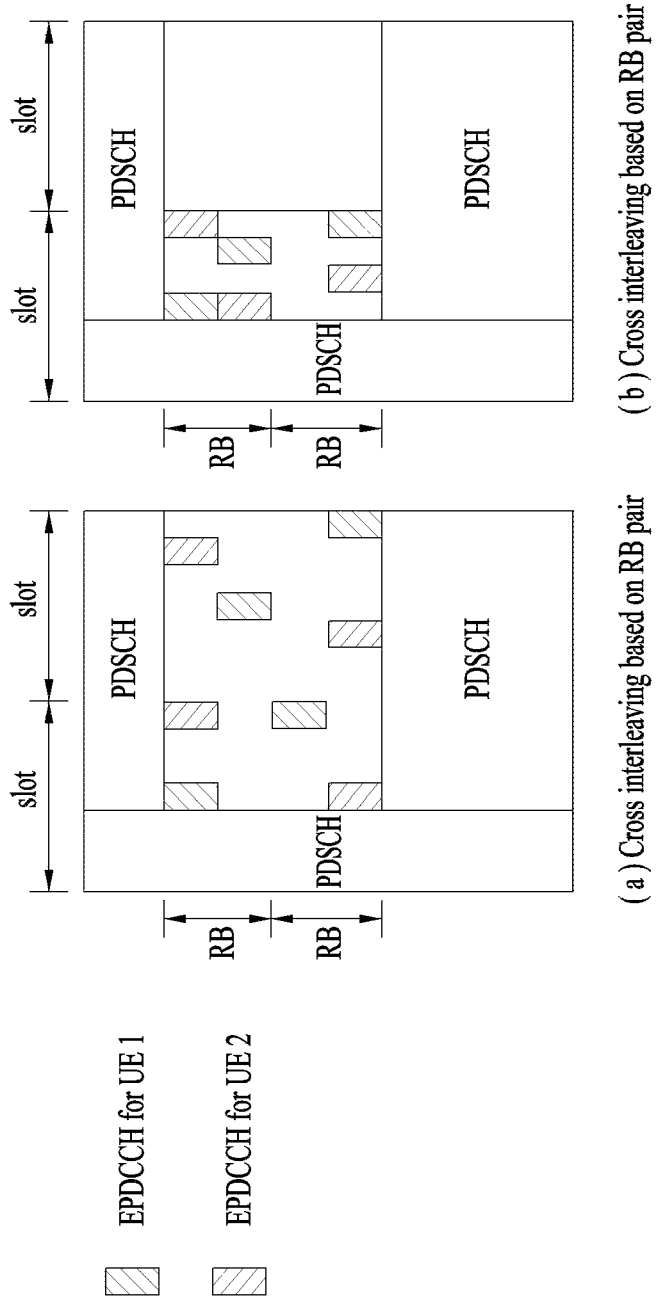
FIG. 6 is a diagram illustrating an enhanced physical downlink control channel (EPDCCH).

FIG. 6 is a conceptual diagram illustrating a method for multiplexing EPDCCH for a plurality of UEs.

Specifically, FIG. 6(a) shows an example in which a common PRB set is configured on the basis of a PRB pair and cross increasing is performed on the basis of the common PRB set. In contrast, FIG. 6(b) shows another example in which a common PRB set is configured on a basis of a PRB and cross interleaving is performed on the basis of the common PRB set. The schemes of FIGS. 6(a) and 6(b) have advantages in which a diversity gain of the time/frequency domains extending a plurality of RBs can be obtained.

Semi-Persistent Scheduling (SPS)

SPS (Semi-persistent scheduling) is a scheduling method for reducing overhead of control signaling and efficiently employing resources of a limited control channel. SPS is used when the UE uses time-frequency resources within a predetermined time having a relatively long period. According to SPS, signaling for repeatedly allocating resources within the predetermined time generates signaling overhead, so that time-frequency resources (or region) allocated to the UE can be simultaneously scheduled. Therefore, if time-frequency resources for SPS are allocated to the UE within one subframe, the UE may use the corresponding time-frequency resources without using a separate control channel in the next periodically-repeated SPS-subframe.

SPS may be efficiently used for communication such as VoIP (Voice over Internet Protocol) in which timing or necessary resources can be estimated. RRC and PDCCH may be used as the SPS configuration method. An interval of radio resources being periodically allocated is indicated through RRC, and detailed resource allocation information (transmission attributes such as frequency domain RA or MCS) may be transmitted through PDCCH. SPS may use a special ID such as SPS C-RNTI so that SPS can be distinguished from general dynamic scheduling).

The present invention relates to a scheme of determining rate matching with a frequency domain of an SPS-scheduled PDSCH (hereinafter referred to as an SPS PDSCH). In particular, the present invention deals with a problem that occurs when an EPDCCH is configured.

An eNB may configure the EPDCCH or reconfigure a start symbol position of the EPDCCH, and a parameter related to a changed EPDCCH SS may be delivered to a UE through an upper-layer signal such as an RRC signal. The UE may receive the EPDCCH SS-related parameter after the SPS is activated through the PDCCH/EPDCCH. Alternatively, the SPS may be activated through the PDCCH/EPDCCH after the EPDCCH SS-related parameter is received. In this way, the SPS and the EPDCCH may be simultaneously configured.

In this instance, EPDCCH configuration may include information about a PRB pair used for EPDCCH transmission in addition to the start symbol position of the EPDCCH. Therefore, in addition to a start symbol position of the SPS PDSCH, the rate matching scheme and a range, the number, and positions of PRB pairs used for transmission thereof may be determined in a different manner.

Figure 7:
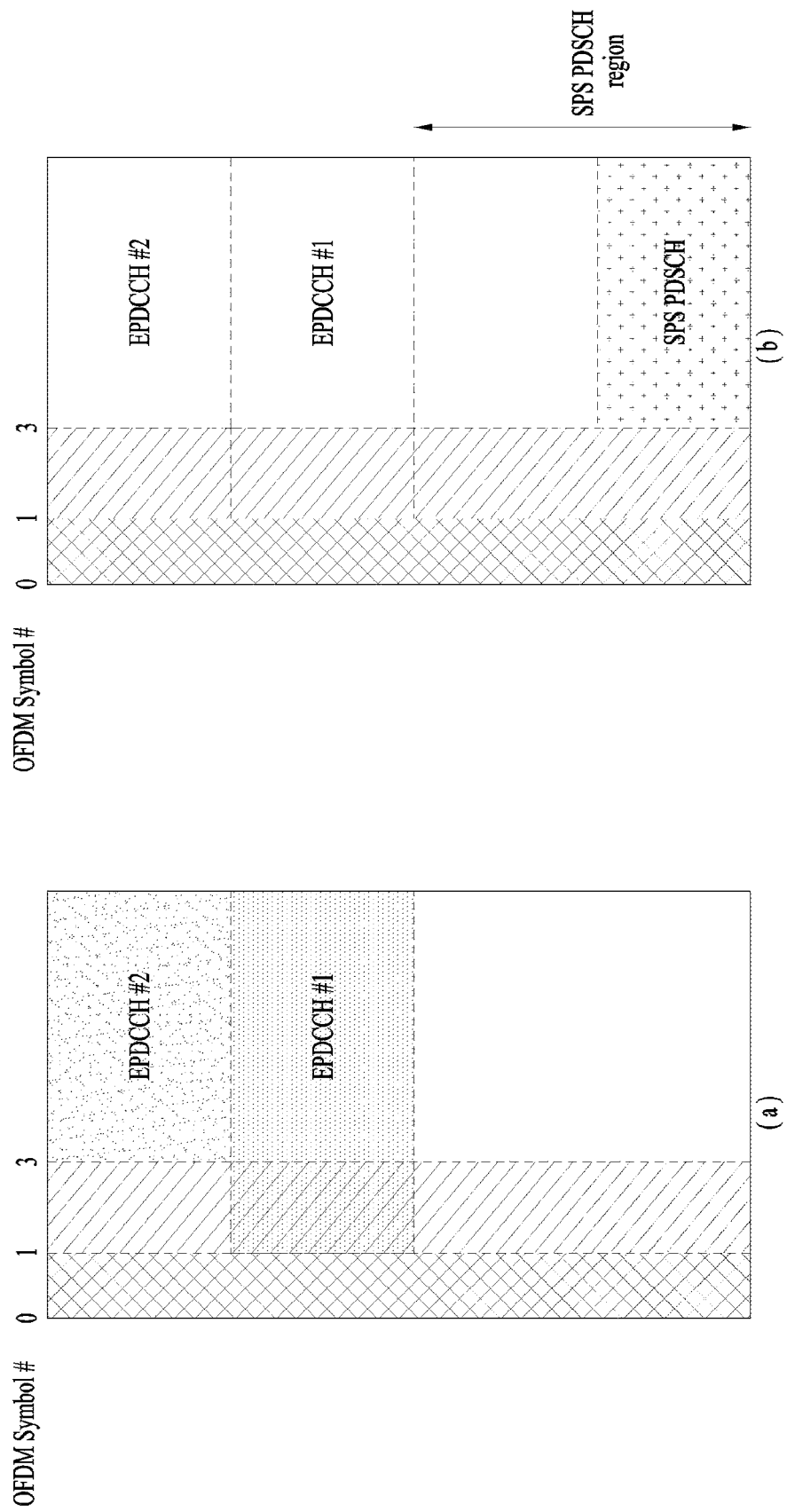
FIG. 7 is a diagram illustrating an example of a configuration of an EPDCCH and a DL data channel for semi-persistent scheduling (SPS) (hereinafter referred to as an SPS-data channel) according to an embodiment of the present invention.

Therefore, in order to minimize an influence between the EPDCCH and the SPS PDSCH, the eNB may configure the SPS PDSCH while avoiding PRB pairs configurable for EPDCCH transmission. In other words, when an available EPDCCH transmission PRB region is configured as in FIGS. 7(a) and 7(b), the eNB may allocate a PRB to be used for SPS PDSCH transmission in a PRB region other than the corresponding region irrespective of whether the EPDCCH is monitored in a corresponding SF, and SPS is activated by activation DCI of the EPDCCH or the PDCCH. In this instance, when the EPDCCH is reconfigured, a current SPS PDSCH region may be not valid any more, and thus SPS activation information needs to be retransmitted.

As another scheme, it is possible to configure a PRB region used for SPS PDSCH transmission (hereinafter referred to as an "SPS PDSCH transmission region") independently of a configuration of a PRB region available for EPDCCH transmission (hereinafter referred to as an "EPDCCH transmissible region"). Here, the expression "independently configured" indicates that the EPDCCH transmissible region and the SPS PDSCH transmission region may be separately configured. Therefore, the two regions may overlap each other. In this case, the SPS PDSCH transmission region allocated by SPS activation may include a portion of the EPDCCH transmissible region (FIG. 8(a)), and thus a physical resource region available for SPS PDSCH transmission may be varied, which requires adequate processing.

When SPS activation DCI is received by the EPDCCH, rate matching of the SPS PDSCH needs to be performed with respect to the EPDCCH transmissible region in a corresponding SF. In other words, the SPS PDSCH may be mapped to a region other than the EPDCCH transmissible region. In this instance, whether to apply rate matching to the SPS PDSCH allocated to an SF thereafter needs to be determined. Simply, rate matching may be performed with respect to the same PRB region as the EPDCCH transmissible region irrespective of whether the SPS PDSCH-allocated SF is an EPDCCH monitoring SF. FIG. 8 shows a case in which SPS is activated by the EPDCCH. FIG. 8(b) shows a case in which rate matching is performed in an SF in which the EPDCCH is monitored, and FIG. 8(c) shows a case in which rate matching is performed in an SF in which the EPDCCH is not monitored.

Meanwhile, rate matching may be performed only in the EPDCCH monitoring SF without performing rate matching in the SF not corresponding to the EPDCCH monitoring SF (hereinafter referred to as "non-EPDCCH monitoring SF").

A similar problem occurs when SPS is activated through the PDCCH in the non-EPDCCH monitoring SF (see FIG. 9). Even when SPS is activated through the PDCCH in the EPDCCH monitoring SF, the similar problem occurs in an SF in which an EPDCCH configuration may vary (see FIG. 10).

Figure 10:
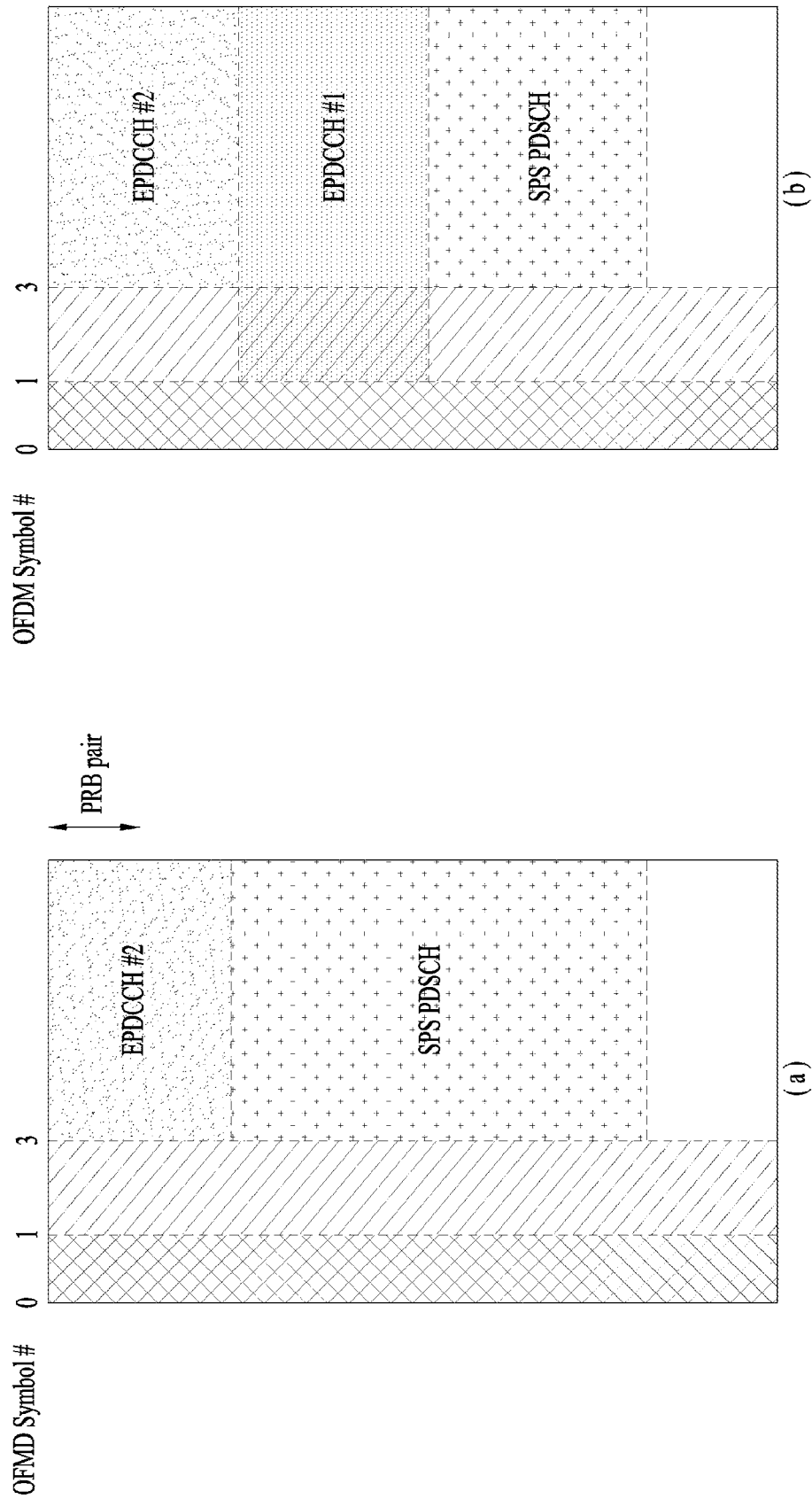
FIG. 10 is a diagram illustrating another example of a configuration of an EPDCCH and an SPS-data channel according to another embodiment of the present invention.

Therefore, in the cases as in FIGS. 9 and 10, a rate matching scheme may be determined similarly to FIG. 8. In other words, even when SPS is activated through the PDCCH, rate matching is performed in the EPDCCH monitoring SF based on the EPDCCH transmissible region. Rate matching is similarly performed when the EPDCCH configuration can vary according to SF. In this instance, rate matching may not be performed in the non-EPDCCH monitoring SF.

In particular, when SPS is activated through the PDCCH, rate matching may be performed with respect to a PRB pair previously included in an EPDCCH set at the time of activation based on rate matching in a future EPDCCH monitoring SF as in FIG. 11.

The above mentioned "EPDCCH transmissible region" refers to a region corresponding to the SS of the UE receiving the EPDCCH. However, the "EPDCCH transmissible region" may extensively refer to an EPDCCH transmissible region from a point of view of a cell based on all SSs that may be allocated to other UEs. In this instance, in both cases, rate matching in the non-EPDCCH monitoring SF may be applied to the same RB as that of the EPDCCH monitoring SF. An RB to which rate matching is applied may be different between the EPDCCH monitoring SF and the non-EPDCCH monitoring SF. For example, while rate matching is performed with respect to an SS region of the UE in the EPDCCH monitoring SF, rate matching may be performed with respect to the EPDCCH transmissible region from the point of view of the cell in the non-EPDCCH monitoring SF. Alternatively, rate matching may be performed reversely or another combination may be configured.

Meanwhile, rate matching may be performed only for a PRB pair including an actually detected EPDCCH. For example, when an aggregation level in 8 PRB pairs is 1 in distributed transmission, the EPDCCH occupies only 4 PRB pairs. Thus, the UE may perform rate matching only with respect to the 4 RBs rather than all 8 RBs.

In localized transmission, rate matching may be performed only for a position in which the EPDCCH is detected rather than performing rate matching with respect to all EPDCCH PRB pairs.

In addition, rate matching may be performed with respect to the EPDCCH transmissible region for both distributed transmission and localized transmission. In this instance, the UE may similarly perform rate matching for a region in which the EPDCCH is detected in the EPDCCH monitoring SF while not performing rate matching in the non-EPDCCH monitoring SF.

In this instance, rate matching may be differently configured depending on whether the EPDCCH is monitored in the corresponding SF and according to transmission scheme (distributed/localized transmission) used for EPDCCH transmission. All possible combinations thereof may be considered.

In particular, rate matching below may be performed depending on whether the EPDCCH transmission scheme corresponds to distributed transmission or localized transmission.

In distributed transmission, rate matching is performed with respect to a PRB pair including an EPDCCH set.
In localized transmission, rate matching is performed with respect to a PRB pair including a detected EPDCCH.

In distributed transmission, when at least one PRB pair in the EPDCCH set is used as the PDSCH, the whole EPDCCH set may not be used for EPDCCH transmission, and thus rate matching is performed based on PRB pairs of the EPDCCH set. In localized transmission, even when some PRB pairs in the set are used as the PDSCH, the EPDCCH may be transmitted using another PRB pair, and thus rate matching is performed with respect to a PRB pair including the detected EPDCCH not based on PRB pairs of the whole EPDCCH set.

In distributed transmission of the EPDCCH configured as in the above example in 8 PRB pairs, the UE may need to perform rate matching with respect to all 8 RBs even when the EPDCCH corresponding to the aggregation level of 1 is detected over 4 PRB pairs. On the other hand, in localized transmission, when the EPDCCH corresponding to the aggregation level of 1 is detected, rate matching may be performed only for 1 RB including the EPDCCH.

In a case of two or more EPDCCH sets, rate matching may be performed with respect to the whole EPDCCH sets, with respect to an EPDCCH-detected EPDCCH set, or with respect to an EPDCCH-detected PRB pair. In distributed transmission, rate matching may be performed with respect to the EPDCCH-detected EPDCCH set or all EPDCCH sets. In localized transmission, rate matching may be performed with respect to the EPDCCH-detected PRB pair.

Rate matching may be performed with respect to the same PRB pair for a subsequent SPS PDSCH that appears by the same SPS activation. In addition, as previously discussed, rate matching may not be performed when the subsequent SPS PDSCH appears in the non-EPDCCH monitoring SF.

The above-mentioned other rate matching scheme may be defined for each transmission mode. The proposed other scheme may be applied to the rate matching scheme which is applied depending on whether an SF is the EPDCCH monitoring SF. In particular, when a distributed transmission-EPDCCH set includes activation, rate matching may be performed with respect to all distributed transmission-EPDCCH sets.

Possible rate matching schemes are summarized as below.
1. Rate matching with respect to a PRB pair in which an EPDCCH is detected
2. Rate matching with respect to a PRB pair including a search space (SS)
3. Rate matching with respect to a PRB pair including the EPDCCH transmissible PRB region from the point of view of the cell (that is, all SSs)
4. When the number of EPDCCH sets is two or more
4-A. 1 to 3
4-B. Rate matching with respect to a PRB pair including an EPDCCH set in which an EPDCCH is detected In some cases, the same scheme may be applied irrespective of whether an SF is the EPDCCH monitoring SF and irrespective of an EPDCCH transmission scheme. In other words, as a simple scheme, a rate matching scheme may be applied to all possible EPDCCH transmission PRB pairs irrespective of whether an SF is the EPDCCH monitoring SF and irrespective of an EPDCCH transmission scheme.

Figure 12:
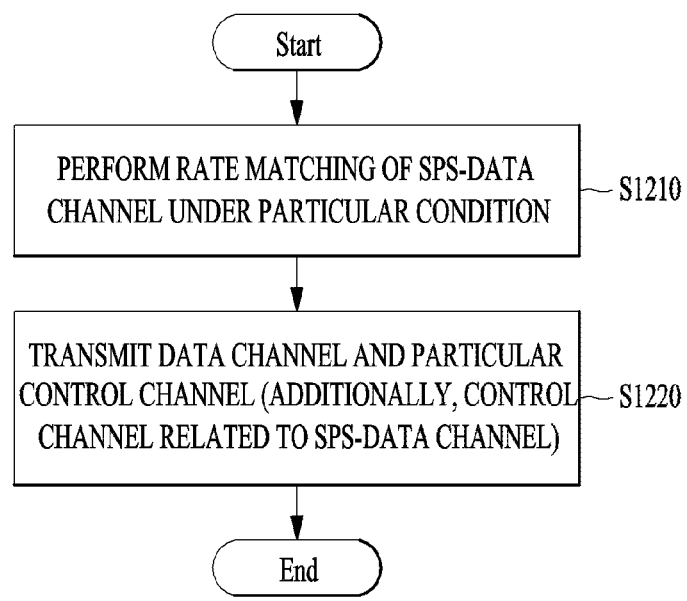
FIG. 12 is a flowchart illustrating an operation of a base station according to an embodiment of the present invention.

FIG. 12 illustrates an example of an operation of a base station according to an embodiment of the present invention.

The base station may perform rate matching of an SPS PDSCH (hereinafter referred to as an "SPS-data channel") in a particular case. The particular case refers to a case in which the SPS-data channel and a particular control channel (for example, an EPDCCH) are scheduled together in one subframe. Therefore, in the particular case, the base station may perform rate matching of the SPS-data channel with respect to the particular control channel in S1210. This operation is performed such that a resource region in which the particular control channel is to be transmitted and a resource region in which the SPS-data channel is to be transmitted do not overlap each other.

As described in the foregoing, a resource region to be considered at the time of rate matching with respect to the particular control channel may vary in some cases. The above description with reference to the drawings is referred to for a specific proposal of rate matching of the SPS-data channel including the variable resource region.

After rate matching of the SPS-data channel is performed with respect to the particular control channel, the base station may transmit the SPS-data channel and/or a control channel related to the SPS-data channel (when the SPS-data channel is activated in a downlink subframe), and the particular control channel in the downlink subframe in S1220.

Figure 13:
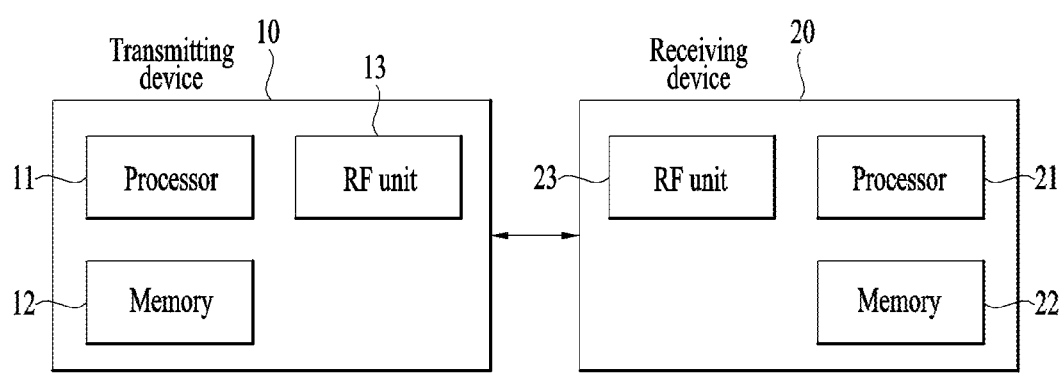
FIG. 13 is a block diagram of an apparatus for implementing embodiment(s) of the present invention.

FIG. 13 is a block diagram of a transmitting device 10 and a receiving device 20 configured to implement exemplary embodiments of the present invention. Referring to FIG. 13, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention can be used for wireless communication systems such as a terminal, a relay, a base station, or other devices.

The invention claimed is:

1. A method of transmitting a downlink signal to a terminal by a base station in a wireless communication system, the method comprising:

performing, by the base station, rate matching of a semi-persistent scheduling (SPS) downlink data for a search space (SS) region specific to the terminal in enhanced physical downlink control channel (EPDCCH) monitoring subframes, and rate matching of the SPS downlink data for a resource block pair region available for EPDCCH transmission in non-EPDCCH monitoring subframes; and transmitting, by the base station, the SPS downlink data and/or control information related to the SPS downlink data, wherein the rate matching of the SPS downlink data is performed with respect to a resource block pair in which the EPDCCH is detected, a resource block pair including a search space specific to the terminal for the EPDCCH, or a resource block pair including all search spaces for the particular EPDCCH.

2. The method according to claim 1, wherein the rate matching of the SPS downlink data is performed in all subframes corresponding to an activation interval of the SPS downlink data.

3. The method according to claim 2, wherein the rate matching of the SPS downlink data is performed in a subframe in which the EPDCCH does not exist among subframes in the activation interval.

4. The method according to claim 1, wherein the rate matching is performed only in a subframe in which the EPDCCH is transmitted.

5. The method according to claim 1, wherein a resource region in which the rate matching is performed is determined according to a transmission mode of the EPDCCH.

6. The method according to claim 5, wherein the rate matching is performed for resource block pairs including EPDDCH sets when the transmission mode of the EPDCCH corresponds to distributed transmission.

7. The method according to claim 5, wherein the rate matching is performed for resource block pairs in which EPDCCH for the terminal is detected when the transmission mode of the EPDCCH corresponds to localized transmission.

8. A method of receiving a downlink signal from a base station by a terminal in a wireless communication system, the method comprising:
- receiving, by the terminal, a semi-persistent scheduling (SPS) downlink data and/or control information related to the SPS downlink data,
- wherein rate matching of the SPS downlink data is performed for a search space (SS) region specific to the terminal in enhanced physical downlink control channel (EPDCCH) monitoring subframes,
- wherein the rate matching of the SPS downlink data is performed for a resource block pair region available for EPDCCH transmission in non-EPDCCH monitoring subframes, and
- wherein the rate matching of the SPS downlink data is performed for a resource block pair in which the EPDCCH is detected, a resource block pair including a search space specific to the terminal for the EPDCCH, or a resource block pair including all search spaces for the EPDCCH.

9. A terminal for receiving a downlink signal from a base station in a wireless communication system, the terminal comprising:
- a radio frequency (RF) unit; and
- a processor that controls the RF unit,
- wherein the processor:
  - controls the RF unit to receive a semi-persistent scheduling (SPS) downlink data and/or control information related to the SPS downlink data,
- wherein rate matching of the SPS downlink data is performed for a search space (SS) region specific to the terminal in enhanced physical downlink control channel (EPDCCH) monitoring subframes,
- wherein the rate matching of the SPS downlink data is performed for a resource block pair region available for EPDCCH transmission in non-EPDCCH monitoring subframes, and
- wherein the rate matching of the SPS downlink data is performed for a resource block pair in which the EPDCCH is detected, a resource block pair including a search space specific to the terminal for the EPDCCH, or a resource block pair including all search spaces for the EPDCCH.

\* \* \* \* \*